July 8, 1958     H. J. NEIDHART     2,842,410
ROLLER BEARING

Filed Oct. 20, 1953     2 Sheets-Sheet 1

INVENTOR,
HERMANN J. NEIDHART by Sommers & Young
Attorneys

July 8, 1958 H. J. NEIDHART 2,842,410
ROLLER BEARING
Filed Oct. 20, 1953 2 Sheets-Sheet 2

INVENTOR,
HERMANN J. NEIDHART by Sommers & Young
Attorneys

United States Patent Office 2,842,410
Patented July 8, 1958

2,842,410

ROLLER BEARING

Hermann J. Neidhart, Geneva, Switzerland

Application October 20, 1953, Serial No. 387,191

Claims priority, application Switzerland November 26, 1952

9 Claims. (Cl. 308—215)

The invention relates to a roller bearing and to a method of producing the same as well as to a tool for carrying out this method, and has the principal object of providing a roller bearing which offers to the rolling movement of its rollers on their races a substantially constant resistance which neither increases nor diminishes appreciably with loading.

It is a further object of the invention to provide a roller bearing in which the aforesaid resistance has a predetermined motion-damping value.

It is yet a further object of the invention to provide a roller bearing as aforesaid which is adapted to carry axial as well as radial loads, for example as a pivot pin bearing for railway bogies.

It is a still further object of the invention to provide a roller bearing as aforesaid which is adapted to translational movement, for example for the support of the weight of a bridge, in order to provide statically determined loads.

It is another object of the invention to provide a roller bearing in which any wandering of the roller bodies in a direction transverse to the rolling movement and their slipping in the direction of the rolling movement relative to the races of the bearing is prevented.

It is a subsidiary object of the invention to provide a roller bearing in which any contact between adjacent rollers is obviated. Conversely it may be a subsidiary object of the invention to provide a roller bearing as aforesaid in which contact between adjacent rollers is deliberately established.

It is still another object of the invention to provide a roller bearing as aforesaid wherein the relative movement of the two races is limited within a predetermined range.

It is moreover an object of the invention to provide a method for producing cylindrical roller bearings as aforesaid.

It is furthermore an object of the invention to provide a tool for carrying out the aforesaid method of producing a cylindrical roller bearing.

With these and other objects in view, I provide a roller bearing comprising, in combination, two metal races and a plurality of roller bodies consisting of a resilient non-metal material inserted between the said two races pre-loaded, the said roller bodies having in the relieved condition substantially circular cross sections, and in the pre-loaded condition being deformed to a cross section flattened at the zones of contact with the said races. The resilient material of the roller bodies preferably belongs to the group consisting of natural and artificial rubber.

One of the races, in the case of a rotary bearing preferably the outer race, may be grooved in the direction of the rolling movement in order to prevent the roller bodies from wandering in the transverse direction, and the other race, in the case of a rotary bearing preferably the inner race, may be grooved transversely in order to prevent the roller bodies from slipping in the direction of the movement. Alternatively both the said races may be grooved in the same, transverse or longitudinal, direction, or their surface may be knurled or roughened.

The roller bodies may be made cylindrical for cooperation with cylindrical or flat races, or frusto-conical for cooperation with conical or frusto-conical races, or belled for cooperation with concave, for example, toroid races.

The method according to the present invention comprises the steps of placing resilient rollers into the cylindrical outer race of the bearing, inserting a fluted body of rotation into the center of the bearing, the flutes thereof having a maximum depth at the front end and fading out towards the rear end of the said body, and registering with the said rollers, pushing the said fluted body in the axial direction through the said outer race, deforming thereby the said rollers into their pre-loaded shape, and following-up the said fluted body immediately by the cylindrical inner race.

A tool adapted for carrying out the said method consists of an auxiliary body of rotation removably attached to the end face of the cylindrical inner race and of substantially equal diameter therewith, fluted at its circumference, the flutes being disposed on the circumference corresponding to the intended disposition of the said resilient rollers and being inclined relative to the axis of rotation of the said bearing in the direction towards the front end of the said auxiliary body of rotation.

These and other objects and features of my present invention will be clearly understood from the following description of some embodiments thereof given by way of example with reference to the accompanying drawings, in which.

Figure 1:
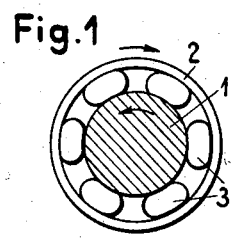
Fig. 1 is an end elevation, partly in section, of a journal bearing according to the invention.
Figure 2:
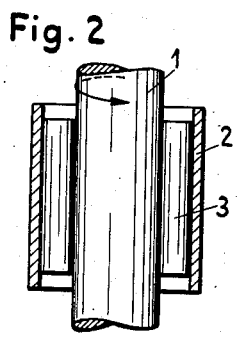
Fig. 2 is a longitudinal section thereof.

The embodiment illustrated in Figs. 1 and 2 of a bearing according to the invention has two cylindrical components 1, 2, arranged coaxially and rotatably in respect of one another, of which the first one is constructed as a shaft, and the second one as a sleeve. Of course, both components could be made tubular. Between the components 1 and 2, the roller bodies 3 are inserted with pre-loading. Prior to their insertion between the components 1, 2, these roller bodies have an at least substantially round cross section. In accordance with the pre-loading imparted to the roller bodies, the same offer more or less of a resistance to the relative rotation of the components 1, 2 owing to molecular rearrangement taking place within these roller bodies, which rearrangement is however unaccompanied by further external deformation. Such bearings may accordingly find application up to a certain extent as motion dampers.

In a bearing of the kind described, it is of particular advantage if careful attention is paid that the roller bodies actually roll on the races of the components 1, 2 and do not slip thereon or wander. For this purpose the races may be roughened, knurled, grooved, sandblasted, or the like to impart a desired surface finish. Even by the choice of suitable materials, a surface finish can be attained which prevents slipping, in that materials having a high coefficient of friction are used.

Figure 3:
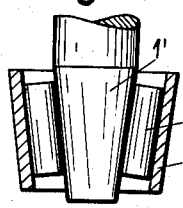
Fig. 3 is a longitudinal section of a conical journal- and thrust-bearing according to the invention.

While, in Figs. 1 and 2, cylindrical components 1, 2 are provided, conical or frusto-conical components may instead be provided according to Fig. 3. The outer component 2' could, for example, be made funnel shaped and cooperate with a conical or frusto-conical inner component 1'.

Cylindrical as well as conical bearings can be subjected, in addition to a radial loading, to a certain axial loading, and are therefore suitable for example as pivot pin supports in railway bogies with pivot loading.

Figure 4:
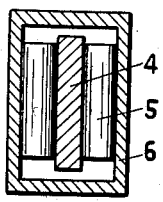
Fig. 4 is a cross section of a translational motion bearing.
Figure 5:
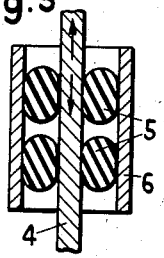
Fig. 5 is a longitudinal section thereof.
Figure 10:
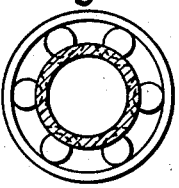
Figure 11:
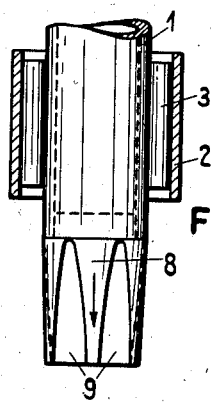
Figure 6:
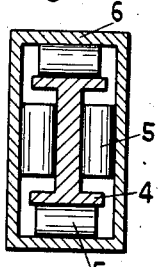
Fig. 6 is a cross section of another translational motion bearing.

As shown in Figs. 4 to 6, the principle of the invention can be applied not only to bearings carrying rotary components but also to bearings for the support of translationally moving components.

Fig. 4, for example, shows the cross section of a bearing structure, in which an inner component 4, which is formed e. g. of flat iron, is supported by means of rubber rollers 5 on an outer component 6. This outer component could be formed, for example, by an angular profile tube or by flat irons, the later being spaced from one another by threaded bolts. As will be seen from Fig. 5, on each side of the inner component 4, two roller bodies 5 are inserted pre-loaded. According to actual conditions, a greater or lesser number of such roller bodies can be provided.

Fig. 6 shows a similar construction in which an I-profile inner component 4 is slidably guided in a rectangular outer component 6 and is supported by means of the roller bodies in two directions. Here, too, in the longitudinal direction of the components 4 and 6, any number of roller bodies desired in the actual circumstances can be arranged in series.

Figure 7:
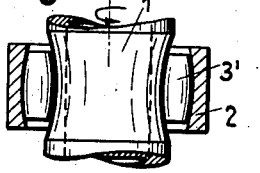
Fig. 7 is a longitudinal section of a belled roller rotary bearing.

Fig. 7 shows another embodiment with concave races, between which belled roller bodies 3' are arranged. Obviously, in this embodiment, too, care is to be taken that the races of the inner component 1 and outer component 2 have a surface finish which prevents any slipping of the roller bodies. Any wandering off of the roller bodies in the axial direction is not possible anyway.

According to actual requirements, the elastic roller bodies may be distributed uniformly or irregularly.

The insertion of the roller bodies of elastic material under pre-loading may cause some difficulties. In order to obviate the same in the assembly of bearings having cylindrical outer and inner components, advantageously an auxiliary body or "distributor" is used. The method of assembling such a bearing, as well as the device used therefor, will now be described with reference to Figs. 8–11 of the drawings.

Figure 8:
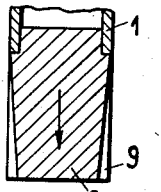
Figs. 8 to 11 illustrate the method of assembling cylindrical journal bearing, and the tool for carrying out this method.
Figure 9:
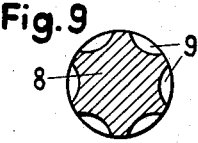

The inner tubular component is denoted 1, the outer one is denoted 2, and the roller bodies are denoted 3. The later are placed into the outer tubular component, and thereafter, the auxiliary body 8 is fitted into the inner tubular component 1 or screwed on to the same, and then the latter, together with the auxiliary body, which conveniently has the same diameter as the inner component, is pushed into the outer tubular component. The auxiliary body has, on its circumference, longitudinal flutes 9 as will be seen from the cross section shown in Fig. 9 and from the longitudinal section according to Fig. 8. These longitudinal flutes 9 run in the longitudinal direction of the body 8 and converge towards the free end thereof. When inserting the auxiliary body into the outer component 2, the roller bodies 3, which conform as regards their number with the number of the flutes, come to lie in the flutes 9, and owing to the inclination thereof, the same can be inserted without difficulty, if desired with the aid of a lubricant which can be easily removed subsequently, the body 8 being pushed in the direction of the arrow (Fig. 8). As soon as the inner component 1 has been brought into the position desired, the auxiliary body is removed; it can be used then for the assembly of the next bearing.

The disposition of the longitudinal flutes 9 may be uniform or irregular, according to whether it is desired to bring the roller bodies into regular or irregular intervals from one another.

Figure 12:
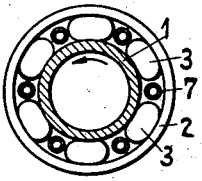
Fig. 12 is an end elevation, partly in cross section, of a modified journal bearing according to the invention.

It may be convenient to provide, between the roller bodies, so called blocking or separating rollers which prevent adjacent roller bodies of rubber from touching or rubbing on one another. Such an embodiment is shown in Fig. 12 in cross section. As will be seen, between the roller bodies 3, there are rollers 7 loosely inserted between the components 1 and 2 which may be cylindrical or conical, the said rollers 7 being hollow or solid as desired, and consisting for example of metal, wood, artificial material or the like. The rollers 7 may be combined in a cage, provided that thereby their rotation about their own axes is not affected. The provision of such rollers 7 prevents adjacent rubber bodies 3 from coming into contact with oppositely moving surface portions and being damaged thereby.

In some cases however, the motion intended to be performed lies within a predetermined range, which is often very small. In this case it may, conversely, be desirable to cause the roller bodies to rub on one another. Alternatively, stops may be built into the bearing proper, and the casing, too, may be used as an abutment.

Figure 13:
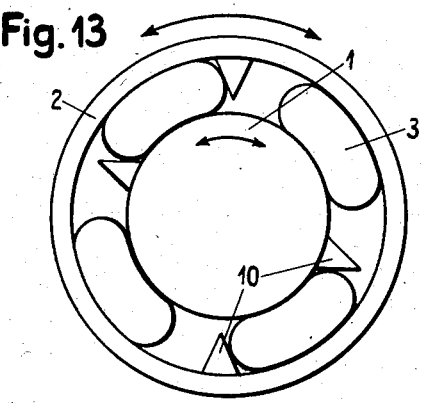
Fig. 13 is an end elevation of another embodiment of a journal bearing according to the invention.

In Fig. 13, inner and outer stops 10 are arranged mutually offset on the inner race 1 and on the outer race 2, the shape of which stops is such that, when the rollers 3 about the stops as a result of relative turning of the components 1 and 2 as indicated in Fig. 13 by arcuate arrows, the rollers deform so as to contact the said stops snugly along their whole length. The relative movement of the inner and outer races is thereby kept within predetermined limits.

Figure 14:
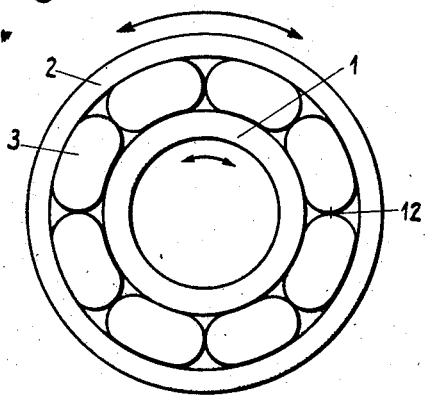
Fig. 14 is an end elevation of yet another modification of a journal bearing according to the invention.

According to Fig. 14, the limitation of movement can be alternatively effected in that the roller bodies mutually lock one another by more or less strongly abutting on one another at places 12. The bearing then permits movements in the direction intended to such an extent only as provided by the resiliency of the rollers or by their mutual friction.

Figure 15:
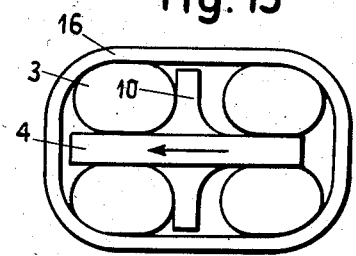
Fig. 15 is an end elevation of another embodiment of a translational motion bearing according to the invention.

Fig. 15 shows stops similar to those according to Fig. 13. In this case, the indicated movement of the inner component 4 relative to a casing 16, as indicated by the arrow, causes the stops 10 to abut the left-hand pair of rollers and compress both of these rollers against the casing. Obviously, reverse relative movement meets similar resistance from the right-hand pair of rollers.

Figure 16:
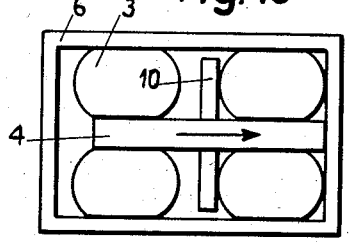
Fig. 16 is an end elevation of a modification thereof.

According to Fig. 16, the device can be so constructed that at the moment of the rollers snugly contacting the stops, the inner component 4 abuts on the outer component 6, whereby an additional stop is formed.

As will have been noticed, the embodiments according to Figs. 15 and 16 are for translational movement of the inner component relative to the outer component.

While I have hereinabove described, and illustrated in the accompanying drawings, what may be considered typical and particularly useful embodiments of my said invention, I wish it to be understood that I do not limit myself to the particular details and dimensions described and illustrated, for obvious modifications will occur to a person skilled in the art.

What I claim as my invention and desire to secure by Letters Patent, is:

1. A resilient bearing device comprising a pair of rigid, relatively movable members having opposed roller-engaging surfaces constituting roller races, said races being normally spaced uniformly apart to define a predetermined roller path of constant width therebetween and being movable in opposite directions along said path while maintaining said constant width of said roller path over the length thereof, and a plurality of rollers of elastic rubber-like material and circular cross-section when unstressed, said rollers being distributed in spaced apart relationship along said path and being radially compressed between the races for rolling thereon in said path and out of contact with one another, relative movement of the races in said opposite directions along said path being opposed only by internal resistance of said roller material to elastic deformation due to rolling of the rollers under radial compression, and variation of the normally uniform spacing of the races over the length of said path being opposed only by elastic resistance of the rollers to radial compression, whereby said relatively movable members are at all times free from positive transmission of forces from one to the other within the device and relative movement of the races along said path is opposed only by said internal resistance of the roller material to elastic deformation due to rolling of the rollers under radial compression.

2. A resilient bearing device according to claim 1 in which one of said members is an inner member at least partially surrounded by the other, said members being disposed for relative rotation about a common axis, and said rollers being distributed about the inner member between it and the outer member.

3. A resilient bearing device according to claim 1 in which one of said members is an inner member surrounded by the other member, and said rollers are distributed about the inner member and surrounded by the other member.

4. A resilient bearing device according to claim 1 in which one of said members is an inner member normally disposed concentrically within and surrounded by the other member for relative rotation about a common axis, and said rollers are distributed about the inner member and surrounded by the other member for rolling in a closed continuous path along said races about said common axis.

5. A resilient bearing device according to claim 1 in which one of said members is an inner member having an external roller-engaging surface of circular cross-section and the other has an internal roller-engaging surface of circular cross-section surrounding the inner member for relative rotation of said roller-engaging surfaces about a common axis, and said rollers are distributed about the inner member and surrounded by the other member for rolling along said external and internal surfaces about said common axis.

6. A resilient bearing device according to claim 1 in which said roller-engaging surfaces are provided with small surface irregularities for resisting slipping of the rollers on said surfaces.

7. A resilient bearing device comprising a pair of rigid relatively movable members having normally concentric, roller-engaging surfaces of circular configuration in transverse section, said surfaces being disposed in opposed, spaced relationship and constituting rigid, annular, roller races, and a plurality of rollers of elastic rubber-like material and circular cross-section when unstressed, said rollers being distributed in spaced apart relationship and radially compressed between said members for rolling engagement therewith in predetermined paths along said races and for resisting relative movement of said members both along and transversely of said paths, rotation of said rollers being resisted substantially only by the internal resistance of said roller material to elastic deformation in rolling while under radial compression, between said members, said relatively movable members being spaced one from the other, and said spacing being maintained against radially directed forces solely by elastic resistance of said rollers to radial compression, whereby said relatively movable members are at all times free from positive transmission of forces from one to the other within the device.

8. A resilient bearing device according to claim 7 in which said roller engaging surfaces are provided with small surface irregularities for resisting slipping of the rollers on said surfaces.

9. A resilient bearing device comprising a pair of rigid, relatively movable members having normally concentric, roller-engaging surfaces of cylindrical configuration disposed in opposed, spaced relationship and constituting rigid annular, roller races, and a plurality of cylindrical rollers of elastic rubber-like material and circular cross-section when unstressed, said rollers being distributed in spaced apart relationship and radially compressed between said members for rolling engagement therewith in predetermined paths along said races and for resisting relative movement of said members both along and transversely of said paths, rotation of said rollers being resisted substantially only by the internal resistance of said roller material to elastic deformation in rolling while under radial compression between said members, said relatively movable members being spaced one from the other, and said spacing being maintained against radially directed forces solely by elastic resistance of said rollers to radial compression, whereby said relatively movable members are at all times free from positive transmission of forces from one to the other within the device.

References Cited in the file of this patent

UNITED STATES PATENTS

| 1,590,055 | Porter | June 22, 1926 |
| 1,751,479 | Holmes | Mar. 25, 1930 |
| 1,798,125 | Holmes | Mar. 24, 1931 |
| 1,961,536 | Thiry | June 5, 1934 |
| 2,189,870 | Sluyter | Feb. 13, 1940 |
| 2,400,374 | Selnes | May 14, 1946 |
| 2,416,578 | Garden | Feb. 25, 1947 |
| 2,712,742 | Neidhart | July 12, 1955 |
| 2,819,060 | Neidhart | Jan. 7, 1958 |
| 2,819,063 | Neidhart | Jan. 7, 1958 |

FOREIGN PATENTS

| 595,578 | Great Britain | Dec. 9, 1947 |
| 946,559 | France | June 8, 1949 |